(12) United States Patent
Johnson et al.

(10) Patent No.: US 6,325,615 B1
(45) Date of Patent: Dec. 4, 2001

(54) INJECTION MOLDING SYSTEM

(75) Inventors: J. Evan Johnson, Eden Prairie; Eric Carl Branwall, Burnsville, both of MN (US)

(73) Assignee: Thermetic Products, Inc., St. Louis Park, MN (US)

( * ) Notice: Subject to any disclaimer, the term of this patent is extended or adjusted under 35 U.S.C. 154(b) by 0 days.

(21) Appl. No.: 09/421,613

(22) Filed: Oct. 20, 1999

Related U.S. Application Data

(60) Provisional application No. 60/104,926, filed on Oct. 20, 1998.

(51) Int. Cl.[7] ............................................. B29C 45/20
(52) U.S. Cl. .............................. 425/549; 264/328.15
(58) Field of Search ................................ 425/549, 577; 264/328.15

(56) References Cited

U.S. PATENT DOCUMENTS

| | | | |
|---|---|---|---|
| 4,157,806 | * | 6/1979 | Bourdon et al. ............... 425/577 |
| 4,557,685 | * | 12/1985 | Gellert ............................ 425/549 |
| 4,563,795 | * | 1/1986 | Fournier . | |
| 4,771,534 | * | 9/1988 | Gellert ............................ 425/549 |
| 5,575,941 | * | 11/1996 | Johnson . | |

* cited by examiner

Primary Examiner—Tim Heitbrink

(74) Attorney, Agent, or Firm—Patterson, Thuente, Skaar & Christensen, P. P.A.

(57) ABSTRACT

An injection molding system with an electric heater has a reusable high temperature electrical connection assembly that provides a very secure small diameter high current inline coupling. The system is comprised of a mold, a heater, connecting wire to a power source and a connector assembly. The heaters and the mold are conventional and well known in the art. The connector assembly, in a preferred embodiment, has a male portion and a female portion. Each is permanently connectable to two wire ends to be removably connected. The male connector portion has a metallic tubular portion with a first end open for insertion and attachment by crimping or brazing of one wire end, and a second end having exterior threads for joining to the female portion. The second end also has a conductive pin integral with the metallic tubing and extending axially outward therefrom. The female portion has another metallic tubular portion with one end open for insertion and attachment by crimping or brazing of the other wire end to be connected, and an opposite end with an opening sized to receive the conductive pin and a flange. A nonconductive nut with internal threads is rotatably positioned on the second metallic tubular portion, adjacent the flange, for engagement with the exterior threads. High temperature resistant insulative tubing is disposed on the metallic tubular portions except for the flange and exterior threads such that the insulative nut is rotatable to secure the male and female and no conductive parts are exposed. The connection facilitates replacement of failed heaters by simply decoupling the connection, removing the heater/connector portion and replacing same with a working heater/connector portion assembly.

4 Claims, 2 Drawing Sheets

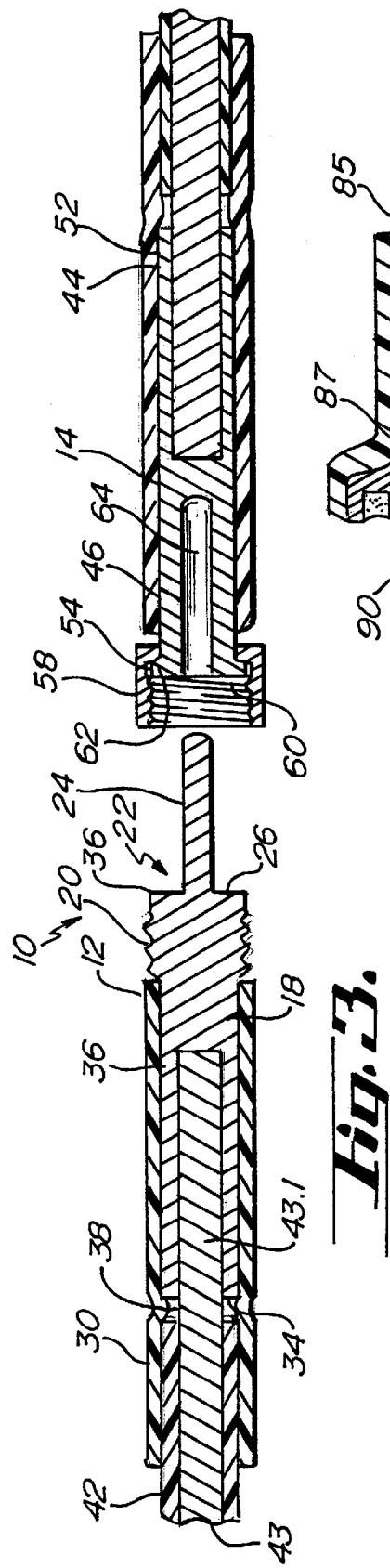
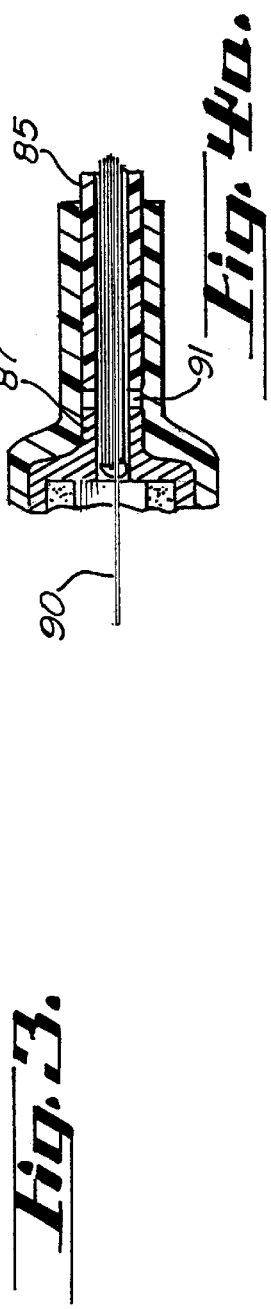
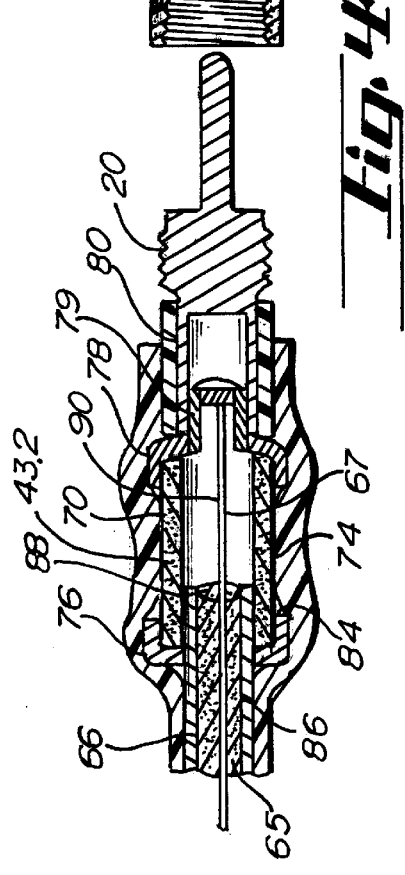

INJECTION MOLDING SYSTEM

This application is based on U.S. Provisional Patent Application Ser. No. 60/104,926, filed Oct. 20, 1998.

BACKGROUND OF THE INVENTION

This invention relates to heater systems for injection molding equipment, particularly, the invention relates to such systems with heaters which require periodic replacement.

Plastic injection molding utilizes steel molds which are separable and have cavities into which molten plastic resin is injected. The pressures that the molds are subjected to can be extreme and thus the mold components are often massive to support such pressures. Often the nozzles which are utilized to inject the plastic resin into the mold cavities have ancillary heating to properly maintain the molten resin temperature. The ancillary heating is provided by heater coils or cartridges placed on or at the nozzles. In that these nozzles and ancillary heaters are positioned within the mold parts, channels, pipes, and tubing are provided thru the mold parts to provide electrical power to the heaters. The channel, tubing, and pipe sizes are kept to a minimum to reduce tooling costs and preserve the mold strength. The heaters conventionally utilize magnesium wire and operate at 240 volts. Such heaters periodically burn out.

The channels, pipe and tubing are typically electrically conductive so that the connection components must be insulated. The limited space, the high current requirements, and the necessity of maintaining the integrity of the electrical path, make conventional friction electrical connections, such as bullet and spade connectors unsuitable for these applications. Thus in the conventional system, connections between the heaters and conductor wires which run thru the mold parts are brazed or permanently crimped. When the heater burns out, the heater and the connecting wires has to be pulled through channels, pipe or tubing. New wires then need to be fished through the channels, pipe, or tubing. Alternately, the wires must be cut and rebrazed or new non-reusable crimp connectors installed. This is a time consuming process and can result in very expensive downtime for the injection molding equipment.

SUMMARY OF THE INVENTION

An injection molding system with an electric heater has a reusable high temperature electrical connection assembly that provides a very secure small diameter high current inline coupling.

The system is comprised of a mold, a heating, connecting wire and a connector assembly. The heaters and the mold are conventional and well known in the art. The connector assembly, in a preferred embodiment, has a male portion and a female portion. Each is permanently connectable to two wire ends to be removably connected. The male connector portion has a metallic tubular portion with a first end open for insertion and attachment by crimping or brazing of one wire end, and a second end having exterior threads for joining to the female portion. The second end also has a conductive pin integral with the metallic tubing and extending axially outward therefrom. The female portion has another metallic tubular portion with one end open for insertion and attachment by crimping or brazing of the other wire end to be connected, and an opposite end with an opening sized to receive the conductive pin and a flange. A nonconductive nut with internal threads is rotatably positioned on the second metallic tubular portion, adjacent the flange, for engagement with the exterior threads. High temperature resistant insulative tubing is disposed on the metallic tubular portions except for the flange and exterior threads such that the insulative nut is rotatable to secure the male and female connector portions together.

An object and advantage of the invention is that it allows wires to be quickly de-coupled and coupled in order to change the electric heater.

In injection molding applications, where the wires are run from the electrical component through channels, pipe or tubing to the power source, with this connection assembly, the wires can be left in place and only component needs to be removed and replaced. For example, a nozzle heater core.

A further object and advantage of the invention is that the threaded means of coupling eliminates accidental de-coupling, such as that which can occur with friction type connectors such as bullet and spade.

The small size allows it to be used in areas where space precludes the use of larger locking type plug connections.

These advantages also apply to similar components, particularly in the injection molding context, such as thermocouples.

BRIEF DESCRIPTION OF THE DRAWINGS

FIG. 3 is a cross-sectional view of one embodiment of a connector assembly according to the invention.

FIG. 4 is a cross-sectional view of another embodiment of a connector assembly according to the invention including a terminal at the end of a heater lead wire including a metallic sheath, the terminal directly connecting to a first connector portion.

FIG. 4a is a cross-sectional view of the terminal as shown in FIG. 4 except with the terminal connecting to an insulated lead wire rather than directly to a connector portion.

DETAILED DESCRIPTION OF PREFERRED EMBODIMENTS

Figure 1:
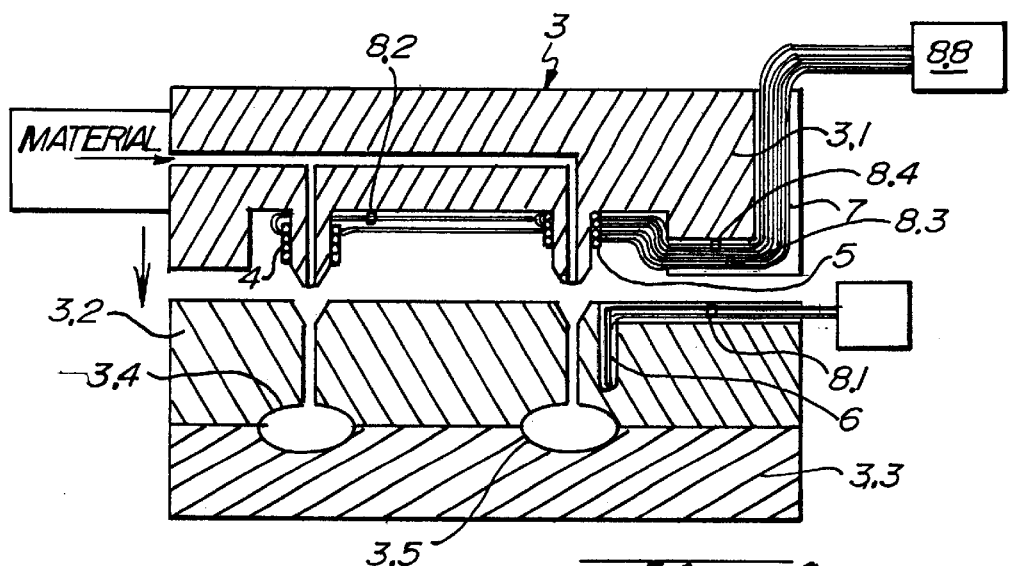
FIG. 1 is a cross-sectional block diagram of a molding system in accordance with the invention.
Figure 2:
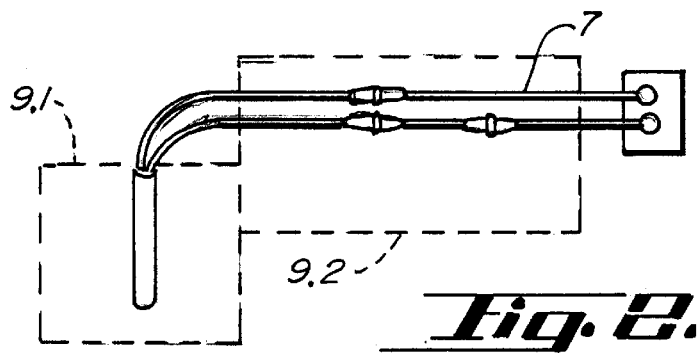
FIG. 2 is a block diagram of a system in accordance with the invention.

Referring to FIG. 1, an injection molding system in accordance with the invention is shown. The system comprises a mold 3 comprised of three mold parts 3.1, 3.2, 3.3 and mold cavities 3.4, 3.5, replaceable heaters 4, 5, 6, connecting wire 7, reusable connector assemblies 8.1, 8.2, 8.3, and 8.4 and power source 8.8. FIG. 2 illustrates the electrical components in isolation. The first dashed block 9.1 represents the equipment portion to be heated and the second dashed block 9.2 represents a hostile environment with minimal access, such as plastic injection mold which operates at high temperatures and with channels therethrough for running the connecting wire.

The most significant parts of the system are the connector assemblies which facilitate the easy replacement of the heaters. Referring to FIG. 3, one embodiment of a connector assembly 10 is shown and generally comprises a first connector portion 12, shown configured as a male connector portion, and a second connector portion 14, shown configured as a female connector portion.

The male connector portion comprises a tubular metallic portion 18 with a first threaded portion configured as exteriorly exposed threads 20, and a first electrical connection portion 22 comprising a protruding portion 24, configured as a pin, and a face 26. In a preferred embodiment the tubular metallic portion, the first threaded portion, and the first electrical connection portion are all integral and may be comprised of stainless steel, copper, nickel, or brass and may appropriately be plated, such as with silver. The metallic tubular portion has a first end 34 and a second end 36. The first end 34 has an opening 38 to receive a first wire end 42 of a connecting wire 43. Said connecting wire will typically extend to a ceramic termination 43.2 as illustrated in FIG. 4 for making connection to the heater lead wire. The connecting wire has a wire conductor 43.1 and insulation comprised of a high temperature resistant plastic. Although the wire conductor 43.1 of FIGS. 3 and 4 is illustrated as solid it also could be stranded as illustrated in FIG. 4a. The conductor wire is brazed or crimped to the tubular metallic portion 18. Insulative material 30, such as PTFE (polytetrafluoroethylene) shrink tubing is disposed on the metallic tubular portion and covers any otherwise exposed conductor wire of the connecting wire. The second end 36 of the tubular metallic portion connects to and is integral with first electrical connection portion 22.

The second connector portion 14 is comprised of a metallic tubular portion 44 with a first end 46 and a second end 52. The first end has a flange 54 which retains a second threaded portion configured as nonconductive nut 58 on the second connector portion. The first and second threaded portions make the mechanical connection between the connector portions. A cooperating second electrical connection portion 60 is configured as a face 62 and a recess 64 sized to the pin 24. The first and second electrical connection portions make the electrical connection between the first and second connector portions.

Referring to FIG. 4, the ceramic termination 43.2 for a heater lead wire 65 including the lead wire sheath 66 is shown. The heater lead wire may by as illustrated in U.S. Pat. No. 5,575,941 which is assigned to the owner of this application. Said patent is hereby incorporated by reference. Such a termination utilizes a ceramic hollow cylindrical spacer portion 74 intermediate a pair of end caps 76, 78 bonded to the spacer portion. The lead wire sheath is brazed to first end cap 76 and the conductor 67 of the lead wire is brazed to the reduced diameter portion 79 of the second end cap 78. The reduced diameter of the second end cap is brazed to the metallic tubular portion 80 of the first connector portion. A small section of heat shrinkable tubing will cover the region between the threaded portion 20 and the end cap 78. An addition section of heat shrinkable tubing may then be disposed over the entire termination and the already covered metallic tubular portion 80. Additionally, the end 84 of the metallic sheath 86 which is extending from the heater may be plugged with a glass plug 88. A glass rod (not shown) is heated with a torch to a molten state and applied to the annulus between the lead wire 90 and sheath. The end is also preferably heated. Such a glass plug provides a highly durable seal which is retained mechanically and has a bond to the metallic sheath to cap the end and retain the ceramic material within the sheath.

Referring to FIG. 4a, the configuration of the second end cap 78 attaching to a stranded connecting wire 85 is illustrated. The end 86 of the connecting wire, is brazed to the reduced diameter portion of the second end cap 78 at a juncture 87 as is the conductor 90 of the heater lead wire. A section of shrink tubing enclosed the termination and any gap 91 between the connecting wire insulation 92 and the second end cap 78.

Figure 5:
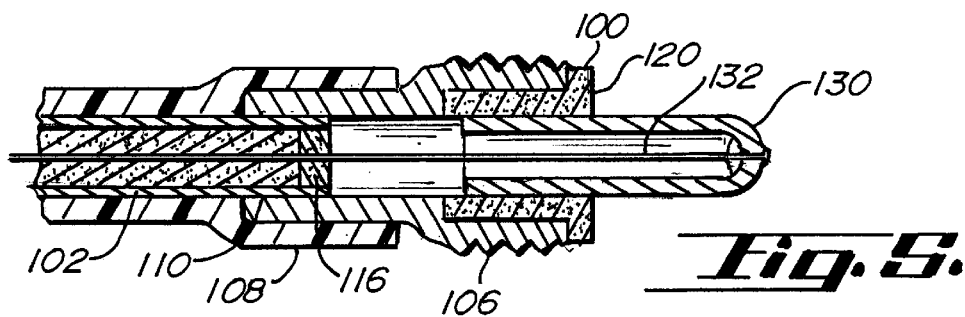
FIG. 5 is a cross-sectional view of an embodiment a first connector component with a pin in accordance with the invention.

Referring to FIG. 5, an alternative embodiment of the male connector portion 100 is shown with a more direct connection between the heater lead wire 102 and the pin 130. The heater lead wire may extend from the heater as disclosed in U.S. Pat. No. 4,563,795, which has a common inventor to this application and which is hereby incorporated by reference. A threaded portion 106 has a shank 108 which is brazed at the juncture 110 with the sheath. The threaded portion is preferably of metal and may be comprised of stainless steel or nickel. A glass plug 116 as described above may be utilized to seal the end of said sheath. A ceramic spacer portion 120 is bonded to the threaded portion by a ceramic metal bonding process which is commercially available and known to those in the art. Suitably, the metal bonded to the ceramic spacer may be a nickel alloy with thermal expansion characteristics substantially the same as the ceramic spacer portion 120. The pin 130 is ideally a highly conductive metal such as copper and may be bonded to the ceramic spacer, and is TIG welded to the conductor wire 132 extending from the lead wire.

The connector portions may be fabricated of an electrically conductive material, such as stainless steel, nickel, brass or copper and may be plated such as by silver.

Figure 6:
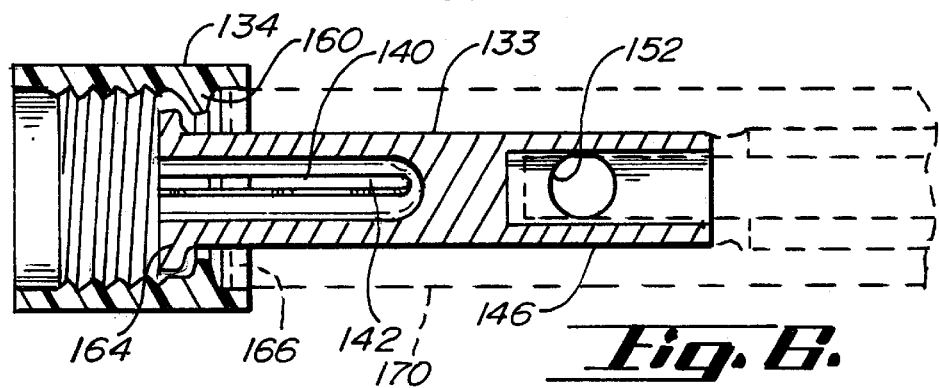
FIG. 6 is a cross-sectional view of a second connector portion and a cooperating nut in accordance with the invention.

Referring to FIG. 6, a further embodiment of a female connector portion 133 and nut 134 is shown. This connector portion has a slit 140 in the proximal or pin receiving portion 142 of the connector portion to facilitate dimensional variations in the proximal portion or the pin. The distal or lead wire receiving portion 146 of the connector portion 133 has a hole 152 which facilitates the plating of this component. For example, a machined stainless steel female connector portion can be plated with silver for high conductivity. which facilitates the plating of this component. For example, a machined stainless steel female connector portion can be plated with silver for high conductivity.

The coupling nut is constructed of nonconductive material such as a ceramic material or a rigid high temperature polymer such as certain polymides or polyetheretherketone. In the embodiment of FIG. 6, the nut 134 has a collar 160 that is retained by the flange 164 and the end 166 of shrink tubing 170, shown in outline, and extends over the nut. Thus no direct contact is possible with exposed metal on this second connector portion.

As illustrated in the various embodiments above, with the shrink tubing covering the exposed metal portion of the connector portions, the non conductive nut is still rotatable coupling and de-coupling. The entire connector is then electrically insulated allowing it to come into contact with grounded surfaces, such as the channels, pipes and tubes, that connecting wiring is commonly routed through.

The diameter of the connection, including the heat shrinkable tubing may be configured to less than 0.250 inches. A nut outside diameter of 0.210 inches has been found to be ideal, fitting in typical mold channels and providing ease of coupling and de-coupling.

Thus, when a heater in an injection molding system fails, the connection is decoupled the heater and lead wires removed and replaced with a new heater with lead wires by securing the heater and coupling the new heater lead wires to the connecting wires to the power source. Thus the invention includes the injection molding system with such a reconnectable connection, separate and combined components such as the connection itself and heaters with a connecting portion attached thereto. Also included is the methodology of replacing failed heaters as described above.

Although the connection as described above is ideally suited for the injection molding environment, it is recognized that it may also be suited for other applications. Moreover, the invention may be embodied in other specific forms without departing from the spirit or essential attributes thereof, and it is therefore desired that the preferred embodiments be considered in all respects as illustrative and not restrictive, reference being made to the appended claims rather than to the foregoing description to indicate the scope of the invention.

What is claimed is:

1. An injection molding system comprising:
   a) a mold assembly;
   b) a heater for heating specific regions of the mold assembly: and
   c) connecting wire for connecting the heater to a power source, the connecting wire including a high temperature wire connector assembly for removably connecting two wire ends for facilitating the replacement of the heater, the assembly comprising:
      i) a male connector portion comprising a metallic tubular portion with a first end open for insertion of and connection with a wire conductor and the second end having exterior threads for joining to the female portion, the wire electrically connectable within the tubular portion, a conductive pin extending coaxially outward from the second end of the tubular portion, insulative material disposed on the metallic tubular portion with the exterior threads exposed; and
      ii) a female connector portion having a metallic tubular portion with a first end and a second end, the first end having a flange and a recess for receiving the conductive pin, the second end having an opening for receiving and attaching to the other wire conductor, a nonconductive nut rotatably attached to the first end at the flange, the nonconductive nut having internal threads configured to cooperate with the external threads on the male connector portion, insulative material disposed on the metallic tubular portion.

2. The injection molding system of claim 1, wherein the insulative material comprises nonconductive fluoropolymer tubing on the metallic tubular portion.

3. The injection molding system of claim 1 wherein the nut is comprised of ceramic material.

4. A combination molding system and nozzle heater with lead wire having reconnectable connections the molding system comprising a mold having a cavity, a nozzle for injection of molten plastic resin into the cavity, a passageway extending through the mold to the nozzle, the nozzle having a configuration accepting of the heater to engage with said nozzle, the lead wire having a connection in proximity to the heater, the lead wire having a first end and a second end electrically connected at said connection, the connection comprising:
   a) a first connector portion comprising a metallic tubular portion with a first end for electrical connection with the first end of the lead wire, and a second end having a threaded portion with threads for joining to a second connector portion and an electrically connective portion, insulative material disposed on the metallic tubular portion with the threads not covered by the insulative material; and
   b) a second connector portion having a metallic tubular portion with a first end and a second end, the first end having a cooperating second electrically connective portion for electrically connecting the second connector portion to the first connector portion, and a second threaded portion configured for cooperating with the first threaded portion to mechanically connect the first connector portion to the second connector portion, one of said first and second threaded portions comprising a nonconductive nut rotatably attached to the respective metallic tubular portion, insulative material disposed on the metallic tubular portion.

* * * * *